(12) United States Patent
Dyson

(10) Patent No.: US 12,323,505 B2
(45) Date of Patent: Jun. 3, 2025

(54) RECEIVER WITH COHERENT MATCHED FILTER

(71) Applicant: Aireon LLC, McLean, VA (US)

(72) Inventor: Timothy Dyson, McLean, VA (US)

(73) Assignee: AIREON LLC, McLean, VA (US)

( * ) Notice: Subject to any disclaimer, the term of this patent is extended or adjusted under 35 U.S.C. 154(b) by 0 days.

(21) Appl. No.: 18/601,000

(22) Filed: Mar. 11, 2024

(65) Prior Publication Data

US 2024/0364495 A1    Oct. 31, 2024

Related U.S. Application Data

(63) Continuation of application No. 18/067,647, filed on Dec. 16, 2022, now abandoned, which is a continuation of application No. 15/995,877, filed on Jun. 1, 2018, now Pat. No. 11,533,159, which is a continuation of application No. 15/462,450, filed on Mar. 17, 2017, now Pat. No. 9,992,011.

(51) Int. Cl.
| | |
|---|---|
| H03D 1/00 | (2006.01) |
| G08G 5/00 | (2006.01) |
| H04L 1/00 | (2006.01) |
| H04L 7/04 | (2006.01) |
| H04L 27/00 | (2006.01) |
| H04B 1/7093 | (2011.01) |

(52) U.S. Cl.
CPC .............. *H04L 7/042* (2013.01); *G08G 5/00* (2013.01); *H04L 1/0054* (2013.01); *H04L 7/048* (2013.01); *H04L 27/0014* (2013.01); *H04B 1/7093* (2013.01)

(58) Field of Classification Search
CPC ....... H04L 7/042; H04L 1/0054; H04L 7/048; H04L 27/0014; G08G 5/00; H04B 1/7093
USPC ................................ 375/341, 219, 295, 316
See application file for complete search history.

(56) References Cited

U.S. PATENT DOCUMENTS

| | | |
|---|---|---|
| 6,792,058 B1 | 9/2004 | Hershey et al. |
| 9,906,265 B1 | 2/2018 | Beard |
| 2008/0150784 A1 | 6/2008 | Zhang et al. |

(Continued)

OTHER PUBLICATIONS

Robert N. McDonough et al., "Detection of Signals in Noise", Second Edition, Academic Press, May 1, 1995, pp. 214-233.

(Continued)

*Primary Examiner* — Zewdu A Kassa
(74) *Attorney, Agent, or Firm* — Baker Botts L.L.P.

(57) ABSTRACT

In one implementation, a receiver has a module to calculate the cross-correlation between a portion of a digital representation of a received signal and a reference signal. The receiver also has a module to generate an estimate of a portion of a message potentially included in the digital representation of the received signal and a screening module to determine the likelihood that the received signal includes a message. For a received signal that is determined likely to include a message, the receiver includes a carrier refinement module to shift the frequency of carrier pulses in the digital representation of the received signal toward a desired frequency and to align the phase of carrier pulses in the digital representation of the received signal with a desired phase and a coherent matched filter to recover the message from the digital representation of the received signal.

18 Claims, 14 Drawing Sheets

(56) References Cited

U.S. PATENT DOCUMENTS

| | | | |
|---|---|---|---|
| 2008/0266166 | A1 | 10/2008 | Schuchman |
| 2009/0027254 | A1 | 1/2009 | Troxel |
| 2010/0014615 | A1* | 1/2010 | Piesinger .......... H03M 13/1515 |
| | | | 375/340 |
| 2010/0253565 | A1 | 10/2010 | Piesinger |
| 2011/0015852 | A1 | 1/2011 | Blomenhofer et al. |
| 2012/0262339 | A1* | 10/2012 | Garcia .................. G01S 5/10 |
| | | | 342/387 |
| 2013/0082867 | A1* | 4/2013 | Malaga ................ H04B 1/1081 |
| | | | 342/40 |
| 2013/0147652 | A1 | 6/2013 | Haque et al. |
| 2014/0153632 | A1 | 6/2014 | Malaga et al. |
| 2016/0035226 | A1 | 2/2016 | Kejik et al. |
| 2016/0041256 | A1 | 2/2016 | Schofield, III et al. |

OTHER PUBLICATIONS

Dariush Divsalar et al., "Pseudo-Coherent Demodulation for Mobile Satellite Systems," published Jan. 1, 1993, Proceedings of the Third International Mobile Satellite Conference (IMSC 1993), pp. 491-496.

RTCA, Inc., Minimum Operational Performance Standards (MOPS) for 1090 MHz Extended Squitter Automatic Dependent Surveillance—Boradcase (ADS-B) and Traffic Information Services—Broadcase (TIS-B), © 2011 RTCA, Inc., Dec. 13, 2011.

P.A. Bello et al., "The Effect of Frequency Selective Fading on the Binary Error Probabilites of Incoherent and Differentially Coherent Matched Filter Receivers," IEEE Transactions on Communications Systems, vol. 11, Issue 2, Jun. 1963, pp. 170-186.

Pascal Dias, "European Surveillance Modernisation in the Global Context," Jul. 4, 2016, ESAVS 2016, Berlin.

Jochen Bredemeyer et al., "Improvement of Weak Signal Detection for ADS-B over Satellite," International Symposium Enhanced Solutions for Aircraft and Vehicle Surveillance Application, Berlin, Germany, Apr. 7-8, 2016.

Alexander Pawlitzki et al., "Space Based ADS-B Payload (Qualification Model)," We look After the Earth Beat, Thales Alenia Space, Apr. 7-8, 2016.

Dr. Helmut Blomenhofer et al., "Space-Based Automatic Dependent Surveillance Broadcase (ADS-B) Payload for In-Orbit Demonstration, A Satellite-Based Solution for Aeronautical Applications," 2012 6th Advanced Satellite Multimedia Systems Conference (ASMS) and 12th Signal Processing for Space Communications Workshop (SPSC), IEEE 2012.

K. Werner et al., "ADS-B Over Satellite, Global Air Traffic Surveillance from Space," Proceedings of ESAV'14, Sep. 15-16, 2014; Rome, Italy.

A. Bettray et al., "Multi-Beam Antenna for Space-Based ADS-B," Department of Antennas & EM-Modelling, IMST, Kamp-Lintfort, Germany, IEEE 2013.

Paolo Noschese et al., "ADS-B Via Iridium NEXT Satellites," Proceedings of ESAV'11; Sep. 23-24, 2011; Capri, Italy.

European Patent Office, International Search Report and Written Opinion, issued in International Patent Application No. PCT/US2018/022216, mailed Jun. 18, 2018.

European Patent Office, International Searching Authority, Search Report and Written Opinion, issued in International Patent Application No. PCT/US2018/022225, mailed Jun. 18, 2018.

U.S. Patent and Trademark Office, Non-final Office Action issued in counterpart U.S. Appl. No. 15/923,396, mailed Dec. 3, 2018.

U.S. Patent and Trademark Office, Final Office Action issued in counterpart U.S. Appl. No. 15/923,396, mailed Mar. 15, 2019.

U.S. Patent and Trademark Office, Non-final Office Action issued in counterpart U.S. Appl. No. 16/166,814, mailed Nov. 28, 2018.

U.S. Patent and Trademark Office, Final Office Action issued in counterpart U.S. Appl. No. 16/166,814, mailed Jun. 5, 2019.

U.S. Patent and Trademark Office, Examiner's Answer issued in counterpart U.S. Appl. No. 15/923,396, mailed Oct. 2, 2019.

U.S. Patent and Trademark Office, Examiner's Answer issued in counterpart U.S. Appl. No. 15/923,396, mailed Oct. 4, 2019.

U.S. Patent and Trademark Office, Notice of Allowance and Fees Due issued in U.S. Appl. No. 16/166,814, mailed Nov. 15, 2019.

* cited by examiner

RECEIVER WITH COHERENT MATCHED FILTER

RELATED APPLICATIONS

This application is a Continuation of U.S. patent application Ser. No. 18/067,647, filed Dec. 16, 2022; which is a Continuation of U.S. patent application Ser. No. 15/995,877, filed Jun. 1, 2018, now U.S. Pat. No. 11,533,159; which is a Continuation of U.S. patent application Ser. No. 15/462,450, filed Mar. 17, 2017, now U.S. Pat. No. 9,992,011, the entire contents of each of which are incorporated herein by reference.

TECHNICAL FIELD

The disclosure relates generally to receiver technology, and more specifically to a receiver with a coherent matched filter.

SUMMARY

According to one implementation of the disclosure, a receiver for receiving 1090 MHz Mode S Extended Squitter ("ES") ADS-B messages includes an analog-to-digital converter configured to convert a received analog signal into a digital representation of the received signal and a carrier detection module configured to determine if a spectral component within a range of 1090 MHz is present within a portion of the digital representation of the received signal. In addition, the receiver includes a cross-correlation module configured to calculate, responsive to a determination by the carrier detection module that a spectral component within the range of 1090 MHz is present within the portion of the digital representation of the received signal, a measure of the cross-correlation between the portion of the digital representation of the received signal and a reference signal representing an expected pulse pattern for a specific portion of a 1090 MHz Mode S ES ADS-B message, the calculated measure of the cross-correlation representing a first measure of the likelihood that the digital representation of the received signal includes a 1090 MHz Mode S ES ADS-B message. The cross-correlation module is further configured to determine if the first measure of the likelihood that the digital representation of the received signal includes a 1090 MHz Mode S ES ADS-B message satisfies a first condition. The receiver also includes a signal estimator module configured to generate, responsive to a determination that the first measure satisfies the first condition, an estimate of a portion of a 1090 MHz Mode S ES ADS-B message potentially included in the digital representation of the received signal corresponding to the portion of the digital representation of the received signal. The receiver further includes a screening module. The screening module is configured to generate a feature vector representing n≥2 features of the estimate of the portion of the 1090 MHz Mode S ES ADS-B potentially included in the digital representation of the received signal, project the feature vector into a corresponding n-dimensional feature space, determine, based on the projection of the feature vector into the feature space, a second measure of the likelihood that the digital representation of the received signal includes a 1090 MHz Mode S ES ADS-B message, and determine if the second measure of the likelihood that the digital representation of the received signal includes a 1090 MHz Mode S ES ADS-B message satisfies a second condition. If it is determined that the second measure satisfies the second condition, the receiver includes a carrier refinement module configured to shift the frequency of carrier pulses in the digital representation of the received signal toward a desired frequency and to align the phase of carrier pulses in the digital representation of the received signal with a desired phase. The receiver also includes a coherent matched filter that is phase-matched to the desired phase and configured to recover a 1090 MHz Mode S ES ADS-B message from the digital representation of the received signal.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Traditionally, air traffic control, aircraft surveillance, and flight path management services have relied on ground-based radar stations and surveillance data processing systems. These systems rely on aircraft-based radio transmitters and terrestrial interrogation and receiving stations to implement systems, such as, for example, primary surveillance radar ("PSR"), secondary surveillance radar ("SSR"), and/or mode select ("Mode S") radar, for communicating aircraft position and monitoring information to local ground stations. The information received at the local ground stations is then relayed to regional or global aircraft monitoring systems. Such conventional radar-based systems for use in air traffic control, aircraft surveillance, and flight path management services are limited to use in regions in which the appropriate ground infrastructure exists to interrogate and receive messages from aircraft. Consequently, vast areas of the world's airspace (e.g., over the oceans and poles, remote and/or mountainous regions, etc.) are not monitored by conventional, terrestrial radar-based systems.

Recently, modernization efforts have been launched to replace radar-based air traffic control, aircraft surveillance, and flight management systems with more advanced automatic dependent surveillance-broadcast ("ADS-B") based systems. In an ADS-B-based system, an aircraft determines its position using a satellite-based navigation system (e.g., the Global Positioning System ("GPS")) and periodically broadcasts its position and, in some cases, other information (e.g., velocity, time, and/or intent, among other information), thereby enabling the aircraft to be tracked. ADS-B-based systems may utilize different data links and formats for broadcasting ADS-B messages. 1090 MHz Mode S ES is an example of one such data link which has been adopted in many jurisdictions. For example, in the United States, the Federal Aviation Administration ("FAA") has mandated 1090 MHz Mode S ES for use by air carrier and private or commercial operators of high-performance aircraft by 2020. Like traditional radar-based systems, ADS-B-based systems require appropriate infrastructure for receiving ADS-B messages broadcast by aircraft. As a result, even as numerous jurisdictions transition to terrestrial, ADS-B-based systems, air traffic in vast airspaces remains unmonitored where there is no such terrestrial infrastructure.

To address this limitation of terrestrial ADS-B systems, satellite-based receivers can be used to receive ADS-B messages broadcast by aircraft, and such ABS-B messages then can be relayed back down to earth terminals or other terrestrial communications infrastructure for transmission to and use by air traffic control, aircraft surveillance, and flight path management services.

Figure 1:
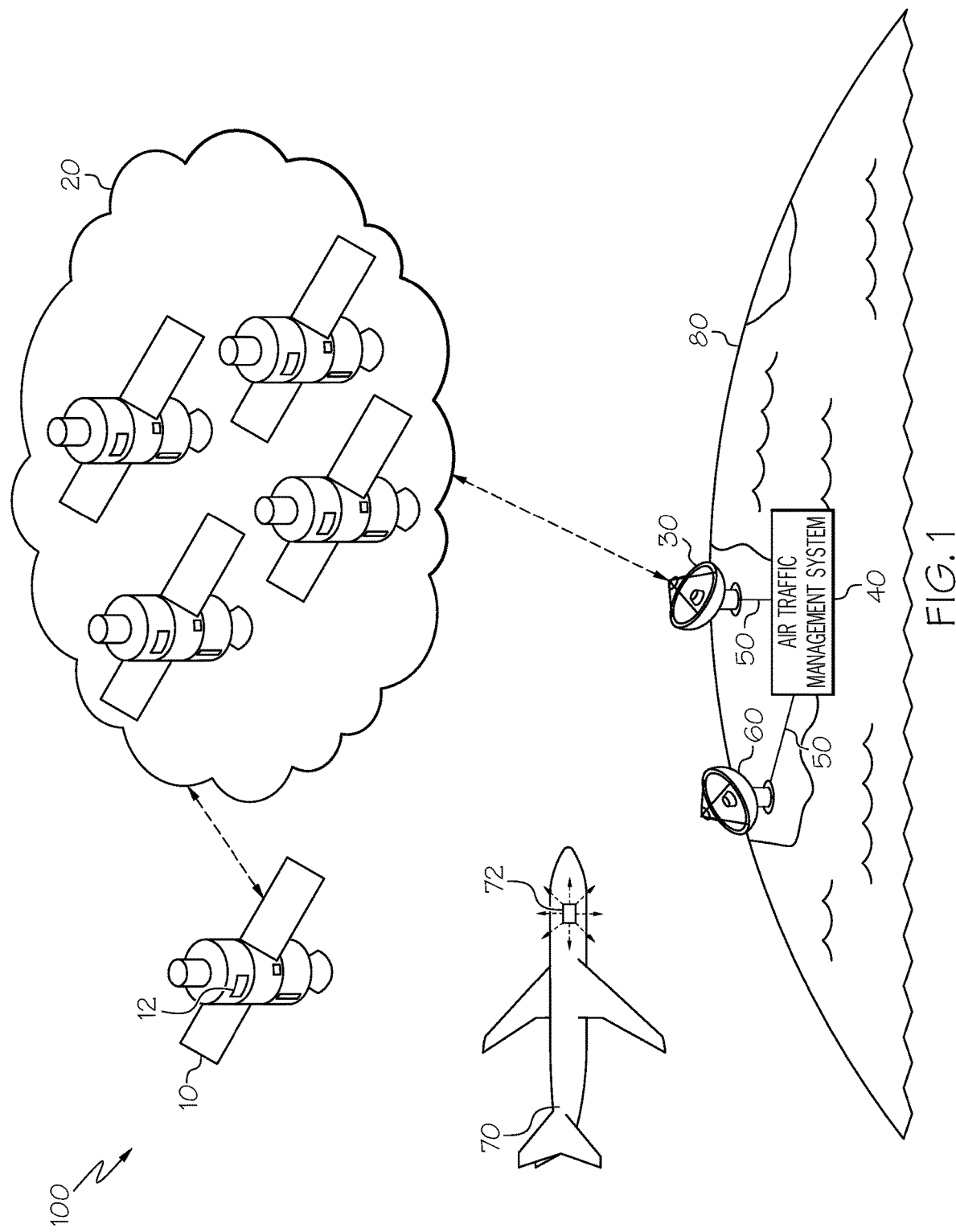
FIG. 1 is a high level block diagram of an example of a space-based ADS-B system in accordance with the present disclosure.

For example, and with reference to FIG. 1, a high-level block diagram of one example of a space-based ADS-B system 100 is illustrated in accordance with the present disclosure. System 100 includes satellite 10 in communication with (and part of) satellite network 20, and aircraft 70. In some implementations, satellite network 20, including satellite 10, may be a low-Earth orbit ("LEO") constellation of cross-linked communications satellites. As illustrated in FIG. 1, terrestrial ADS-B ground station 60, air traffic management system 40 and satellite communication network earth terminal 30 are located on Earth 80's surface.

Aircraft 70 carries an on-board ADS-B transponder 72 that broadcasts ADS-B messages containing flight status and tracking information. Satellite 10 carries ADS-B receiver 12 to receive ABS-B messages broadcast by aircraft 70 and other aircraft. In some implementations, multiple or all of the satellites in satellite network 20 may carry ADS-B receivers to receive ADS-B messages broadcast by aircraft. Messages received at receiver 12 are relayed through satellite network 20 to satellite communication network earth terminal 30 and ultimately to air traffic management system 40 through terrestrial network 50. The air traffic management system 40 may receive aircraft status information from various aircraft and provide additional services such as air traffic control and scheduling or pass appropriate information along to other systems or entities.

In certain implementations, satellite network 20 may have a primary mission other than receiving ADS-B messages broadcast by aircraft. For example, in some implementations, satellite network 20 may be a LEO, mobile satellite communications constellation. In such implementations, ADS-B receivers like ADS-B receiver 12 may be hosted on satellites 10 of satellite network 20 as hosted or secondary payloads that may be considered secondary to the primary mission of the satellite network 20. Consequently, such ADS-B receivers when operated as hosted payloads may be constrained by certain limitations, such as, for example, a relatively low maximum weight (e.g., ~50-60 kilograms/payload) and a relatively low power budget (e.g., maximum average power per orbit of 70 watts) so as not to take away from the primary mission of the satellite network 20.

Terrestrial ADS-B ground station 60 provides aircraft surveillance coverage for a relatively small portion of airspace, for example, limited to aircraft within line of sight of ground station 60. Even if terrestrial ADS-B ground stations like ground station 60 are widely dispersed across land regions, large swaths of airspace (e.g., over the oceans) will remain uncovered. Meanwhile, a spaced-based ADS-B system 100 utilizing a satellite network like satellite network 20 may provide coverage of airspace over both land and sea regions without being limited to areas where ground-based surveillance infrastructure has been installed. Thus, a space-based ADS-B system may be preferable (or a valuable supplement) to terrestrial approaches.

However, implementing a spaced-based ADS-B system, such as, for example, system 100 presents a number of challenges. For instance, as illustrated in FIG. 1, the distance between transponder 72 on an aircraft 70 and terrestrial ADS-B ground station 60 may be much shorter than the distance between a transponder 72 on an aircraft and a satellite 12, which may be, for example, in low-Earth orbit. For example, a typical terrestrial ADS-B ground station like ADS-B ground station 60 may have a typical maximum range of approximately 150 miles whereas a satellite in low-Earth orbit may orbit the Earth at an altitude as high as approximately 1,243 miles. This significant difference in propagation distance for ADS-B messages may make successful detection and reception of ADS-B messages by a satellite-based ADS-B receiver much more difficult than by a terrestrial-based ADS-B receiver. Furthermore, satellites in low-Earth orbit may orbit the Earth at speeds upwards of 17,000 miles per hour, resulting in Doppler shifts that add additional complications to successfully receiving ADS-B messages. Moreover, given the wider coverage area provided by a satellite as compared to a terrestrial ground station, a satellite-based ADS-B receiver may be exposed to a much higher volume of ADS-B messages than a terrestrial-based ADS-B receiver. This increased volume of received ADS-B messages only compounds the difficulty of successfully detecting and receiving ADS-B messages with a satellite-based ADS-B receiver relative to a terrestrial-based ADS-B receiver.

For terrestrial ADS-B receivers, the physical channel may be assumed to exhibit the characteristics of an interference channel, where interference and/or noise may result from interference or noise in the physical channel itself as well as interference or noise in the antenna or receiver. Interference and/or noise in the physical channel may result from multiple aircraft within range of a terrestrial ADS-B receiver broadcasting ADS-B messages in a fashion that is uncoordinated in time. As a result, ADS-B messages that arrive at the terrestrial receiver may interfere and/or overlap with one another. ADS-B messages that interfere and/or overlap with a desired ADS-B message may be referred to as (or may be one component of) false replies unsynchronized with interrogator transmissions or, alternatively, false replies unsynchronized in time ("FRUIT").

Other communications protocols that share the 1090 MHz band with ADS-B also may contribute interference and be a source of FRUIT. For example, aircraft implementing secondary surveillance radar ("SSR") like Mode A, Mode C, or Mode S, may respond to interrogating SSR messages in the 1090 MHz band, potentially creating interference for ADS-B messages. Other transmitters within range of a terrestrial ADS-B receiver transmitting in neighboring or nearby frequency bands also may generate interference or contribute to noise in the physical channel. Appropriately dealing with FRUIT and other interference/noise, particularly for airspaces with a high density of air traffic, may be one challenge faced by a terrestrial ADS-B receiver.

Another challenge faced by a terrestrial ADS-B receiver may be the so-called near-far problem where a signal received at the ADS-B receiver from a relatively nearby aircraft is significantly stronger than a signal received at the ADS-B receiver at the same time from an aircraft that is relatively far from the ADS-B receiver.

A space-based ADS-B receiver may face the same challenges as a terrestrial ADS-B receiver. In addition, as discussed above, a space-based ADS-B receiver may face additional challenges that may be even more imposing than those faced by a terrestrial ADS-B receiver due to, for example, but not limited to, the significantly greater propagation distance between aircraft broadcasting ADS-B messages and the space-based ADS-B receiver, significant Doppler shifts due to the orbital velocity of a satellite, and/or the significantly greater volume of ADS-B messages within the coverage area of a space-based ADS-B receiver relative to a terrestrial ADS-B receiver. Different from the physical channel for a terrestrial ADS-B receiver, the physical channel for a space-based ADS-B receiver may be dominated by noise. Consequently, for a space-based ADS-B receiver, the physical channel may be assumed to exhibit the characteristics of an additive white Gaussian noise ("AWGN") channel with additional interference channel characteristics. Because of this additional noise, the signal-to-noise ratio ("SNR") for an ADS-B message received by a space-based ADS-B receiver typically will be much lower than the SNR for an ADS-B message received by a terrestrial ADS-B receiver. Existing terrestrial ADS-B receivers have been shown to be incapable of achieving satisfactory performance for space-based operation due to the lower SNR of ADS-B messages to be received in space. In fact, existing terrestrial ADS-B receivers are believed to require an SNR that is ~7-10 dB greater than the SNR of an ADS-B message to be received in low-Earth orbit in order to achieve satisfactory performance. For example, a space-based ADS-B receiver in low-Earth orbit may be designed to achieve performance of not worse than 10% bit (or message) error rate at an energy per bit to noise power spectral density ratio ("Eb/No") no more than or equal to 10 dB, whereas existing terrestrial ADS-B receivers typically achieve 10% bit error rate at Eb/No greater than or equal to approximately 18 dB.

The teachings of the present disclosure present receiver designs and techniques for receiving ABS-B messages transmitted by aircraft, particularly 1090 MHz Mode S ES ADS-B messages, from space, for example, on one or more low-Earth orbit satellites. As described in greater detail below, the expected pulse pattern of the preamble and the first few bit periods of the data block for a 1090 MHz Mode S ES ADS-B message may be used to process a signal received by a space-based ADS-B receiver to determine if it is likely to include an ADS-B message. A signal that is determined to be likely to include an ADS-B message then is subjected to further screening, for example, to confirm the presence of an ADS-B message, demodulate the ADS-B message from the received signal, and/or perform error detection and correction of the bits of the demodulated message.

The structure and format of a 1090 MHz Mode S ES ADS-B message is defined in the Radio Technical Commission for Aeronautics' ("RTCA") "DO-260B Minimum Operational Performance Standards for 1090 MHz Extended Squitter Automatic Dependent Surveillance-Broadcast (ADS-B) and Traffic Information Services-Broadcast (TIS-B)." 1090 MHz Mode S ES ADS-B messages are pulse position modulated and have 1 μsec bit periods. A pulse transmitted in the first half of the bit period represents the value of the bit as a "1," while a pulse transmitted in the second half of the bit period represents the value of the bit as a "0." All 1090 MHz Mode S ES ADS-B messages have a specific 8 μsec preamble that identifies such messages as 1090 MHz Mode S ES ADS-B messages followed by a 112 μsec (or 112 bit) data block. The preamble that identifies a message as a 1090 MHz Mode S ES ADS-B message includes a first pulse from 0.0-0.5 μsec, a second pulse from 1.0-1.5 μsec, a third pulse from 3.5-4.0 μsec, and a fourth pulse from 4.5-5.0 μsec.

While detecting the presence of pulses corresponding to the pattern for the preamble for a 1090 MHz Mode S ES ADS-B message may be helpful in identifying the potential presence of an ADS-B message in the received signal, it may be difficult to detect the preamble pulse pattern, which only includes four pulses over the course of 8 bit periods (or 8 μsec), in the presence of noise, particularly for a space-based ADS-B receiver where the pulses may have very little energy and the SNR is very low due to the propagation distance between an aircraft and the space-based ADS-B receiver. Fortunately, however, subsequent bits of a 1090 MHz Mode S ES ADS-B message also may have an expected pulse pattern and be considered in an effort to detect the potential presence of a Mode S 1090 ES ADS-B message in a received signal. Specifically, for a Mode S 1090 ES ADS-B message, the first five bits of the data block following the preamble identify the downlink format ("DF") for the ADS-B message, and, in some implementations of a space-based ADS-B receiver, only ADS-B messages having specific downlink formats may be relevant. For example, in some implementations, only ADS-B messages having downlink formats DF=17, DF=18, or DF=19, which share three bits, may be relevant. Consequently, in addition to the preamble, the first 5 bits of a received signal also may be helpful in identifying the potential presence of an ADS-B message within a received signal, which may improve accuracy in the presence of noise relative to only using the preamble, particularly in the case of a space-based ADS-B receiver where the pulses have very little energy and the SNR is very low due to the propagation distance between an aircraft and the space-based ADS-B receiver.

In some implementations, the cross-correlation between samples of a portion of a received signal (e.g., 13 μsec (or bit periods) of a received signal) and a reference signal representing a first portion (e.g., the first 13 μsec (or bit periods)) of an ADS-B signal may be calculated to determine a measure of the likelihood that the received signal includes an ADS-B message. If the result of calculating the cross-correlation of the samples of the portion of the received signal and the reference signal exceeds a defined threshold value, then additional screening may be performed to determine if the received signal does, in fact, include an ADS-B message.

For instance, constant false alarm rate ("CFAR") detection processing may be applied to a portion of the received signal to further assess the likelihood that the received signal includes an ADS-B message, for example, by determining if the power in the received signal exceeds a threshold level above which the received signal may be considered likely to include an ADS-B message. In some implementations, the threshold may be set in an effort to achieve a desired probability of false alarm (or false alarm rate or time between false alarms), hence the name constant false alarm rate detection. In some implementations, the background against which ADS-B messages are to be detected may be assumed to be constant with time and space, such that a fixed threshold level may be chosen to achieve the desired probability of false alarm, which will be a function of the probability density function of the noise and/or signal-to-noise ratio. In alternative implementations, noise levels may be assumed to change both spatially and temporally, in which case a changing threshold may be used, where the threshold level is raised and lowered to maintain a desired probability of false alarm. Various different algorithms may be used to adaptively select the threshold level, for example, based on the statistics of the background in which the ADS-B messages are to be detected.

If the result of CFAR detection processing suggests that the received signal includes an ADS-B message, a minimum mean square error (MMSE) estimator may be used to generate an estimate of the ADS-B message, or a portion thereof, and various screening techniques may be employed on the ADS-B message estimate to further assess the likelihood that the received signal includes an ADS-B message. In some implementations, a feature vector representing some number n different features of the ADS-B message estimate may be projected into an n-dimensional feature space and the distance between the projection and a region (e.g., a cluster) or a position in the n-dimensional feature space where ADS-B messages would be expected to appear may be calculated. If the distance is less than some defined threshold value, a determination may be made that the received signal is likely to include an ADS-B message. For example, in some implementations, a three-dimensional feature vector representing three features of the ADS-B message estimate may be generated and projected into a three-dimensional feature space. In such implementations, the three features may represent (1) a measure of the consistency of the pulse amplitude across the ADS-B message estimate, (2) a measure of phase consistency across the ADS-B message, and (3) a measure of the residual phase error of the ADS-B message estimate. If the projection of the feature vector in the 3-dimensional feature space is within a defined threshold distance of a region or position in the three-dimensional feature space where ADS-B messages would be expected to appear, a determination may be made that the received signal includes an ADS-B message. The received signal then may be input to a carrier refinement module. The carrier refinement module may estimate the frequency of carrier pulses in the received signal, and, if appropriate, shift the frequency of carrier pulses in the received signal toward a desired frequency and/or align the phase of carrier pulses in the received signal with a desired phase before the received signal is input to a coherent matched filter that is phase-matched to the desired phase to recover the ADS-B message from the received signal.

Figure 2:
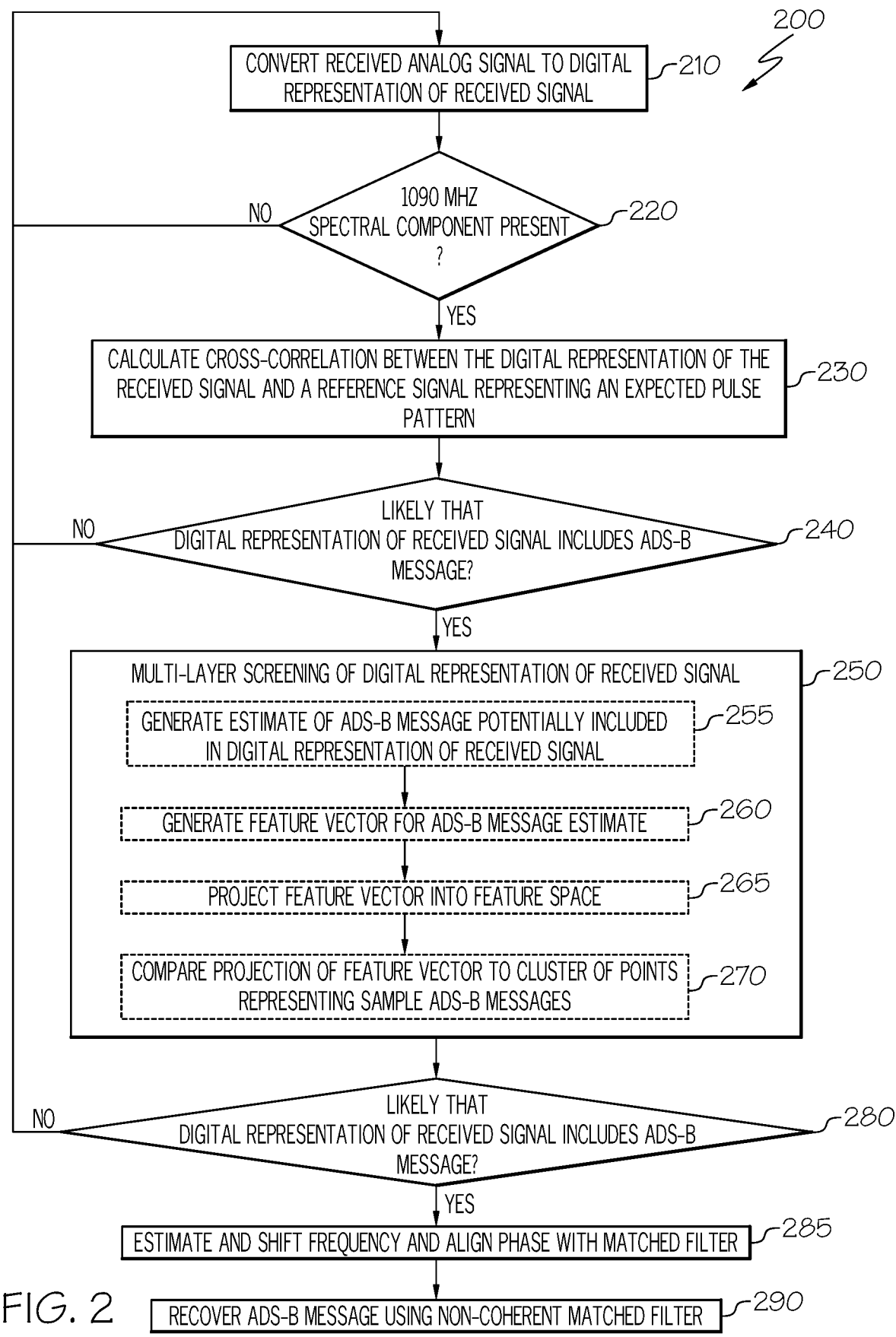
FIG. 2 is a flow chart of a method for receiving 1090 MHz Mode S ES ADS-B messages in accordance with a non-limiting implementation of the present disclosure.
Figure 3:
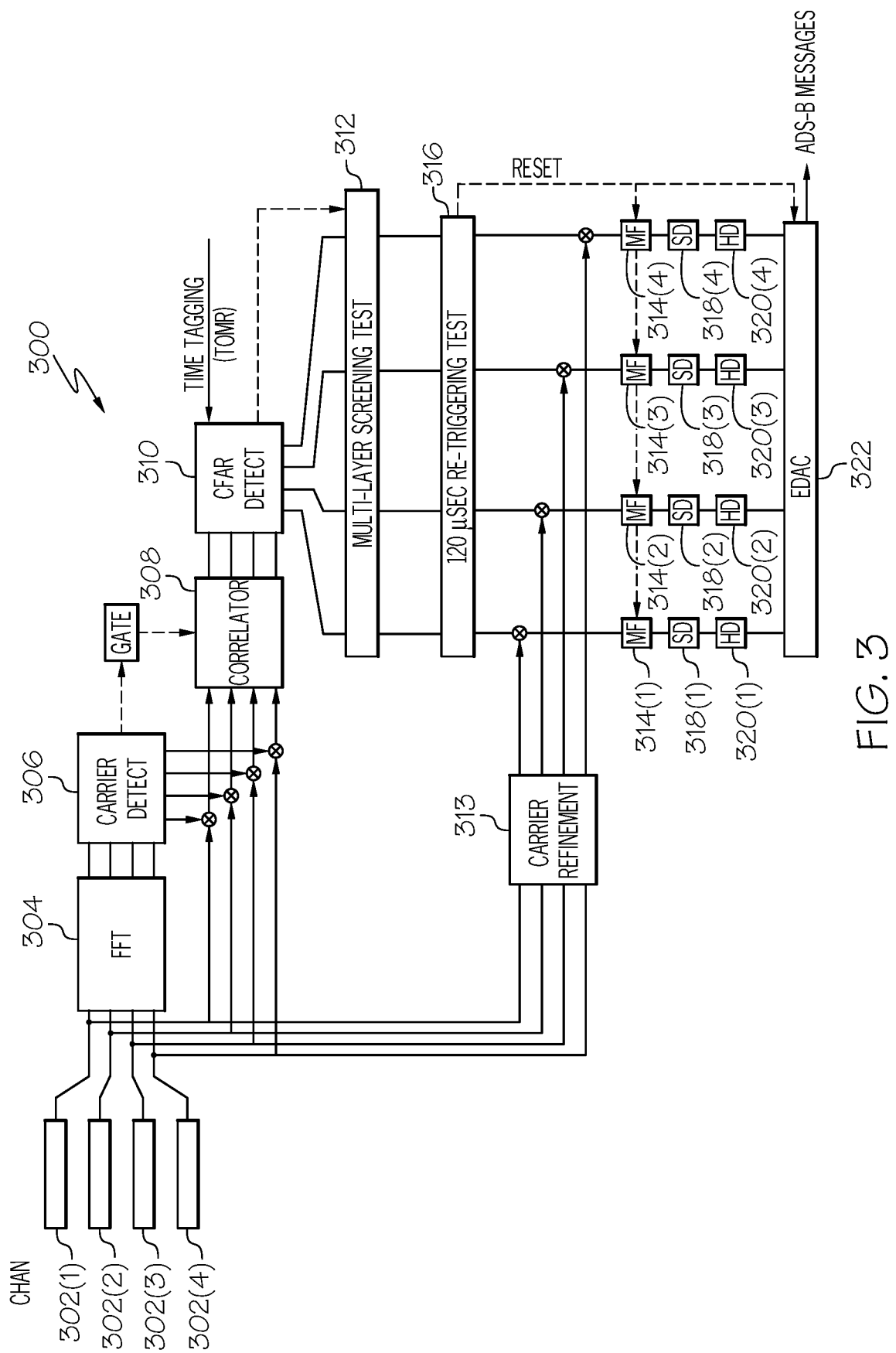
FIG. 3 is a functional block diagram of one example of a receiver for receiving 1090 MHz Mode S ES ADS-B messages in accordance with a non-limiting implementation of the present disclosure.
Figure 4:
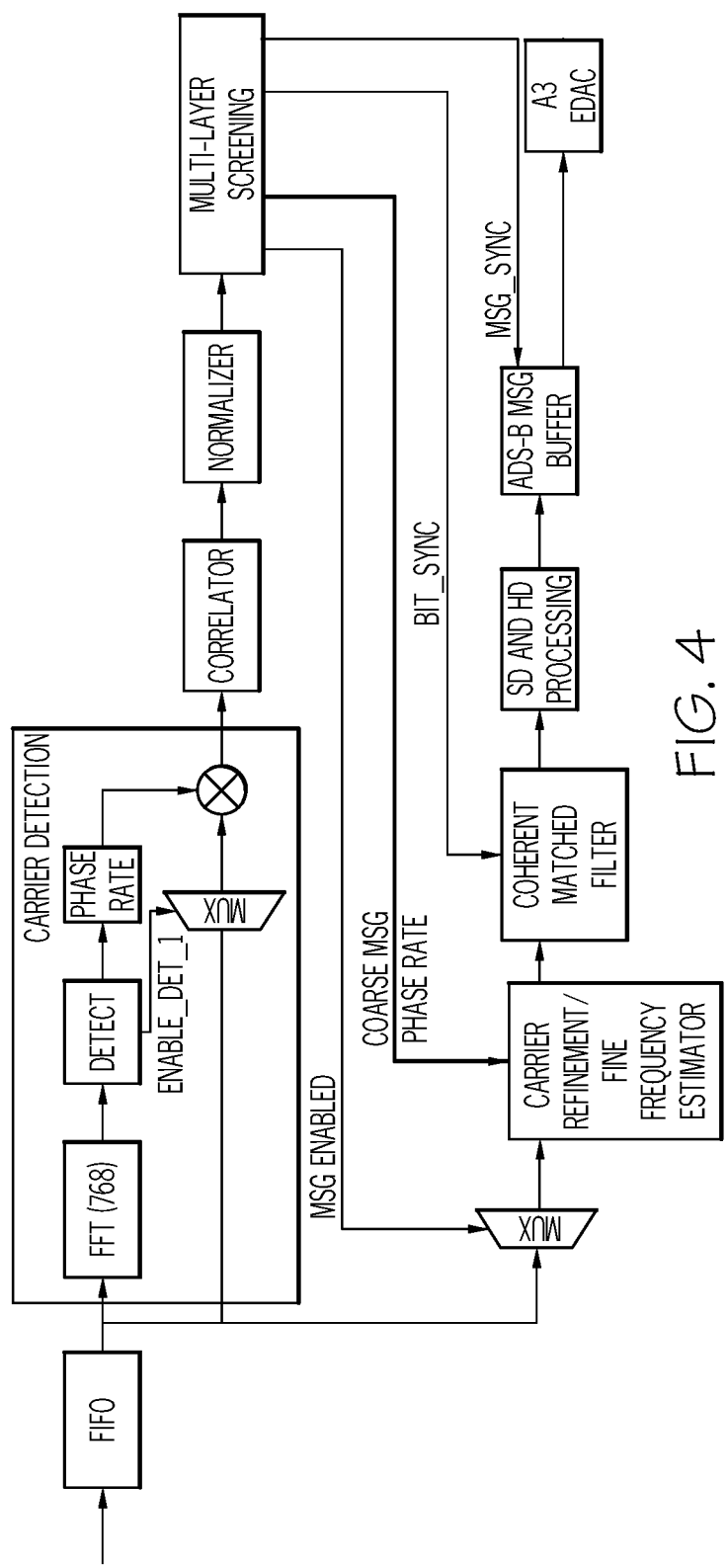
FIG. 4 is a functional block diagram of one example of a receiver for receiving 1090 MHz Mode S ES ADS-B messages in accordance with a non-limiting implementation of the present disclosure.

With reference to FIG. 2, a flow chart of a method 200 for receiving 1090 MHz Mode S ES ADS-B messages is illustrated in accordance with a non-limiting implementation of the present disclosure. In some implementations, method 200 may be performed by a receiver for receiving 1090 MHz Mode S ES ADS-B messages that is implemented in one or more logic modules of a field programmable gate array ("FPGA"). FIG. 3 is a functional block diagram of one example of a receiver 300 (e.g. a multi-channel receiver) for receiving 1090 MHz Mode S ES ADS-B messages that may perform method 200. In some implementations, each block represented in FIG. 3 may correspond to a specific logic module of an FPGA. As illustrated in FIG. 3, receiver 300 includes four channels 302(1)-302(4). Consequently, receiver 300 is capable of processing four received signals concurrently in parallel. Similar to FIG. 3, FIG. 4 is a functional block diagram of one example of a receiver 400 for receiving 1090 MHz Mode S ES ADS-B messages that may perform method 200. As with receiver 300 illustrated in FIG. 3, each block represented in FIG. 4 may correspond to a specific logic module of an FPGA. Although the receiver 400 illustrated in FIG. 4 is shown as having only a single channel, implementations of receiver 400 may include multiple channels (e.g., 4 channels like the receiver 300 illustrated in FIG. 3).

For the purposes of the present disclosure, the method 200 illustrated in FIG. 2 will be described with reference to the receiver 300 of FIG. 3, and, in particular, with reference to a single channel 302 of receiver 300. However, the method 200 illustrated in FIG. 2 may be performed by a variety of different hardware architectures. For example, in contrast to the FPGA implementation of receiver 300, in some implementations, the method 200 illustrated in FIG. 2 may be implemented by one or more microprocessors executing machine-readable instructions stored in electronic memory.

Referring now to FIG. 2, at step 210, a received analog signal (or at least a portion of a received analog signal) is converted into a digital representation of the received analog signal. In some implementations, at least fifteen samples per 1090 MHz Mode S ES ADS-B message bit period (e.g., 15 samples per μsec) may be taken in converting the received analog signal to digital.

Figure 11:
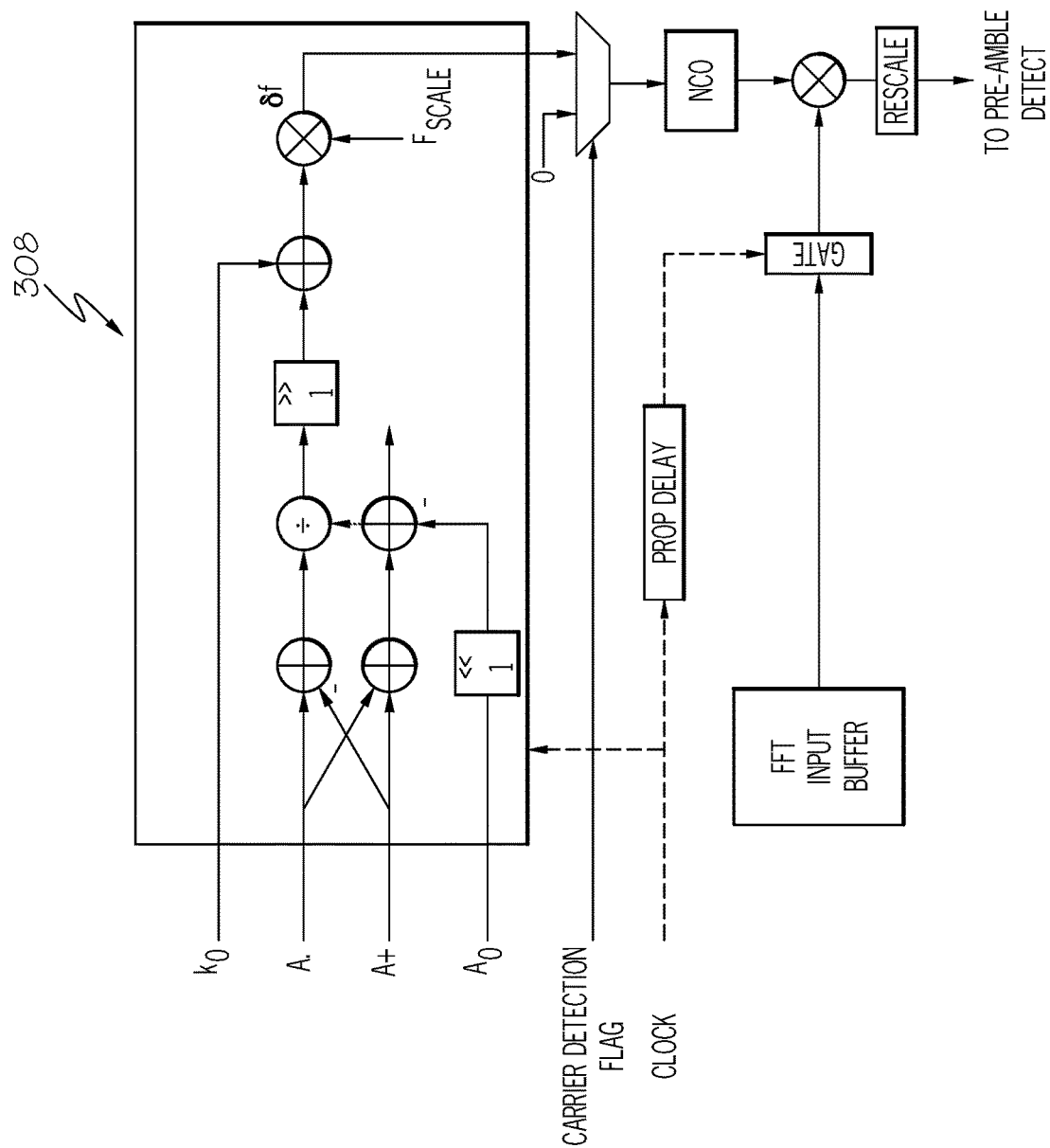
FIG. 11 is a functional block diagram of one example of a carrier frequency estimator in accordance with a non-limiting implementation of the present disclosure.

At step 220, the digital representation of the received signal may be processed to determine if a 1090 MHz spectral component is present. For example, block 304 of receiver 300 of FIG. 3 may perform a fast Fourier transform (FFT) on the digital representation of the received signal (or a portion of the digital representation of the received signal) to convert the digital representation of the received signal (or portion thereof) into the frequency domain. Block 306 then may analyze the frequency domain representation of the digital representation of the received signal (or portion thereof) to determine if a 1090 MHz spectral component is present. In some implementations, a 1090 MHz spectral component may be determined to be present if a spectral component within some defined range of 1090 MHz is present (e.g., +/−1.05 MHz). Additionally or alternatively, in some implementations block 306 may detect the phase of the envelope of the digital representation of the received signal and remove the phase to facilitate detection of the carrier. Furthermore, in some implementations, block 306 also may shift (or attempt to shift) the frequency of the digital representation of the received signal closer to 1090 MHz (e.g., to account for Doppler shift). Moreover, in some implementations, block 306 may include a carrier frequency estimator, such as, for example, a preliminary quadratic frequency estimator, one particular example of which is illustrated in FIG. 11. In some implementations, 8 µsec (e.g., corresponding to the length of the preamble of a 1090 MHz Mode S ES ADS-B message) or 13 µsec (e.g., corresponding to the length of the preamble and the first 5 bit periods of the data block of a 1090 MHz Mode S ES ADS-B message) may be processed to determine if a 1090 MHz spectral component is present.

Referring again to FIG. 2, if a 1090 MHz spectral component is not determined to be present, the digital representation of the received signal (or portion thereof) may be discarded and the process 200 may return to step 210. Alternatively, if a 1090 MHz spectral component is determined to be present, the process 200 may proceed to step 230.

At step 230, the cross-correlation between the digital representation of the received signal (or a portion thereof) and a reference signal representing an expected pulse pattern is calculated. For example, block 308 of receiver 300 of FIG. 3 may calculate the cross-correlation (or the complex cross correlation) between an 8 µsec or 13 µsec segment of the digital representation of the received signal and a reference signal representing the expected pulse pattern of the preamble of a 1090 MHz Mode S ES ADS-B message (e.g., in the case of an 8 µsec segment) or the expected pulse pattern of the preamble and the first 5 bit periods of the data block of a 1090 MHz Mode S ES ADS-B message (e.g., in the case of a 13 µsec segment). In some implementations, the reference signal may represent the perfect theoretical expected pulse pattern (e.g., baseband pulse pattern) in the absence of any noise.

Thereafter, at 240, a determination may be made as to whether it is likely that the digital representation of the received signal includes a 1090 MHz Mode S ES ADS-B message based on the calculated cross-correlation. For example, block 308 of receiver 300 of FIG. 3, may compare a measure of the cross-correlation to a threshold value and determine that it is unlikely that the digital representation of the received signal includes a 1090 MHz Mode S ES ADS-B message if the measure is less than a threshold value or that it is likely that the digital representation of the received signal includes a 1090 MHz Mode S ES ADS-B message if the measure is greater than the threshold value.

In some implementations, additional information may be taken into account at step 240 when determining the likelihood that the digital representation of the received signal includes a 1090 MHz Mode S ES ADS-B message. For example, in some implementations, block 310 of receiver 300 of FIG. 3 may perform CFAR detection processing on the digital representation of the received signal (or portion thereof) as part of determining the likelihood that the digital representation of the received signal includes a 1090 MHz Mode S ES ADS-B message. In such implementations, a determination may be made that it is likely that the digital representation of the received signal includes a 1090 MHz Mode S ES ADS-B message if the measure of the cross-correlation of the digital representation of the received signal (or portion thereof) and the reference signal exceeds a first threshold value and the CFAR detection processing reveals that the power in the received signal exceeds a second threshold level, which may be adjusted dynamically over time in an effort to maintain a desired rate of false alert detection. Otherwise, a determination may be made that it is unlikely that the digital representation of the received signal includes a 1090 MHz Mode S ES ADS-B message.

Referring again to FIG. 2, if it is determined that it is unlikely that the digital representation of the received signal includes a 1090 MHz Mode S ES ADS-B message, the digital representation of the received signal (or portion thereof) may be discarded, and process 200 may return to step 210. Alternatively, if it is determined that it is likely that the digital representation of the received signal includes a 1090 MHz Mode S ES ADS-B message, process 200 may proceed to step 250.

At step 250, additional multi-layer screening of the digital representation of the received signal is performed to further assess the likelihood that the digital representation of the received signal includes a 1090 MHz Mode S ES ADS-B message. For example, multi-layer signal screening test block 312 of receiver 300 of FIG. 3, one particular example of which is illustrated in greater detail in FIG. 5, may perform various different multi-layer screening techniques to further assess the likelihood that the digital representation of the signal includes a 1090 MHz Mode S ES ADS-B message.

In some implementations, and as illustrated in steps 255, 260, 265, and 270 of the example process 200 of FIG. 2 and described in greater detail below, such multi-layer screening may include: (i) generating an estimate of a 1090 MHz Mode S ES ADS-B message (or an estimate of a portion of the 1090 MHz Mode S ES ADS-B message) potentially included in the digital representation of the received signal from the digital representation of the received signal (or from a portion of the digital representation of the received signal) (255); (ii) generating a feature vector representing n≥2 features of the estimated 1090 MHz Mode S ES ADS-B message (or portion thereof) (260); (iii) projecting the feature vector into an n-dimensional feature space (265); and (iv) comparing the projection of the feature vector to a cluster of points in the feature space representing sample 1090 MHz Mode S ES ADS-B messages (270).

Referring specifically to step 255, in some implementations, an estimate of a 1090 MHz Mode S ES ADS-B message (or a portion thereof (e.g., the preamble or the first 13 bit periods) potentially included in the digital representation of the received signal may be generated from the digital representation of the received signal using a minimum mean square error ("MMSE") estimator. For example, in some implementations, an MMSE estimator may be used to generate an estimate of an 8 µsec portion of a 1090 MHz Mode S ES ADS-B message potentially included in the digital representation of the received signal for the purpose of comparing certain features of the estimate to expected or representative features of the preamble of a 1090 MHz Mode S ES ADS-B message. Alternatively, in other implementations, an MMSE estimator may be used to generate an estimate of a 13 µsec portion of a 1090 MHz Mode S ES ADS-B message potentially included in the digital representation of the received signal for the purpose of comparing certain features of the estimate to expected or representative features of the preamble and the first 5 bit periods of a 1090 MHz Mode S ES ADS-B message.

Figure 5:
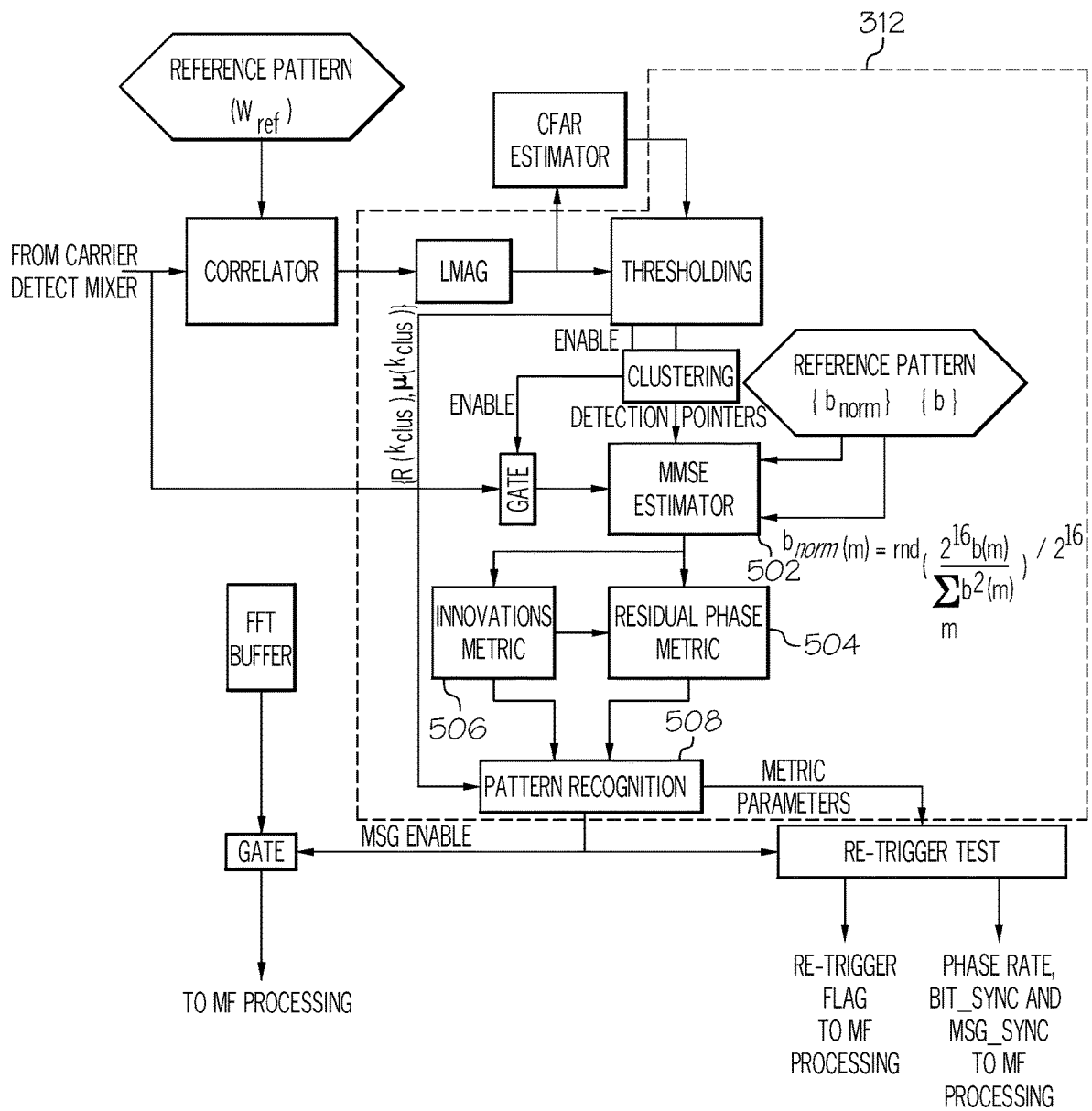
FIG. 5 is a functional block diagram of one example of a multi-layer signal screening test block in accordance with a non-limiting implementation of the present disclosure.
Figure 6:
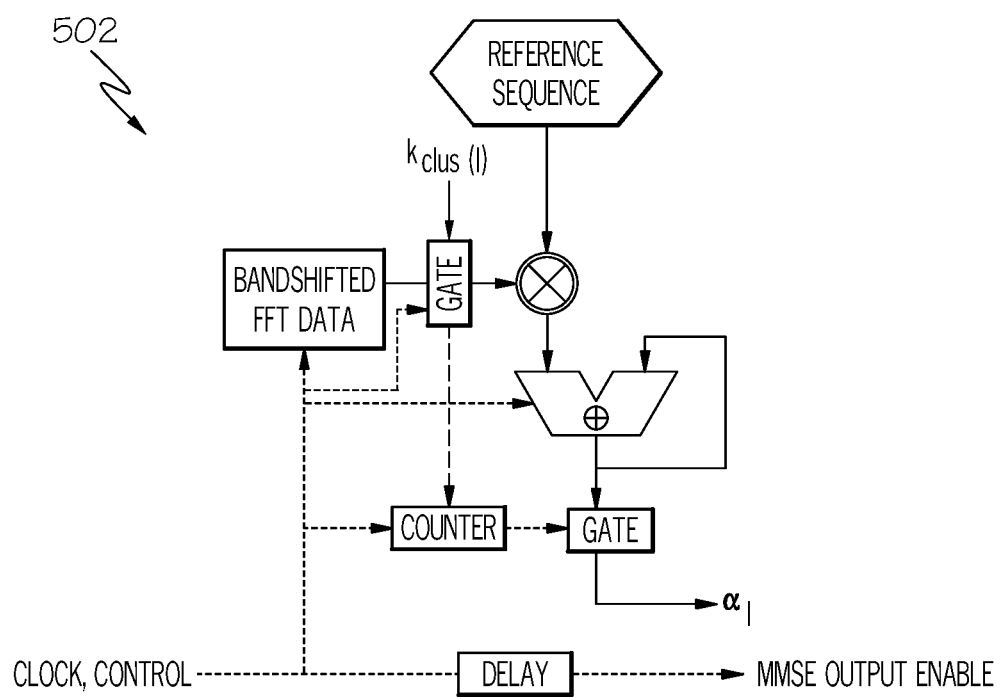
FIG. 6 and FIG. 13 are functional block diagrams of examples of minimum mean square error signal estimators in accordance with a non-limiting implementation of the present disclosure.
Figure 13:
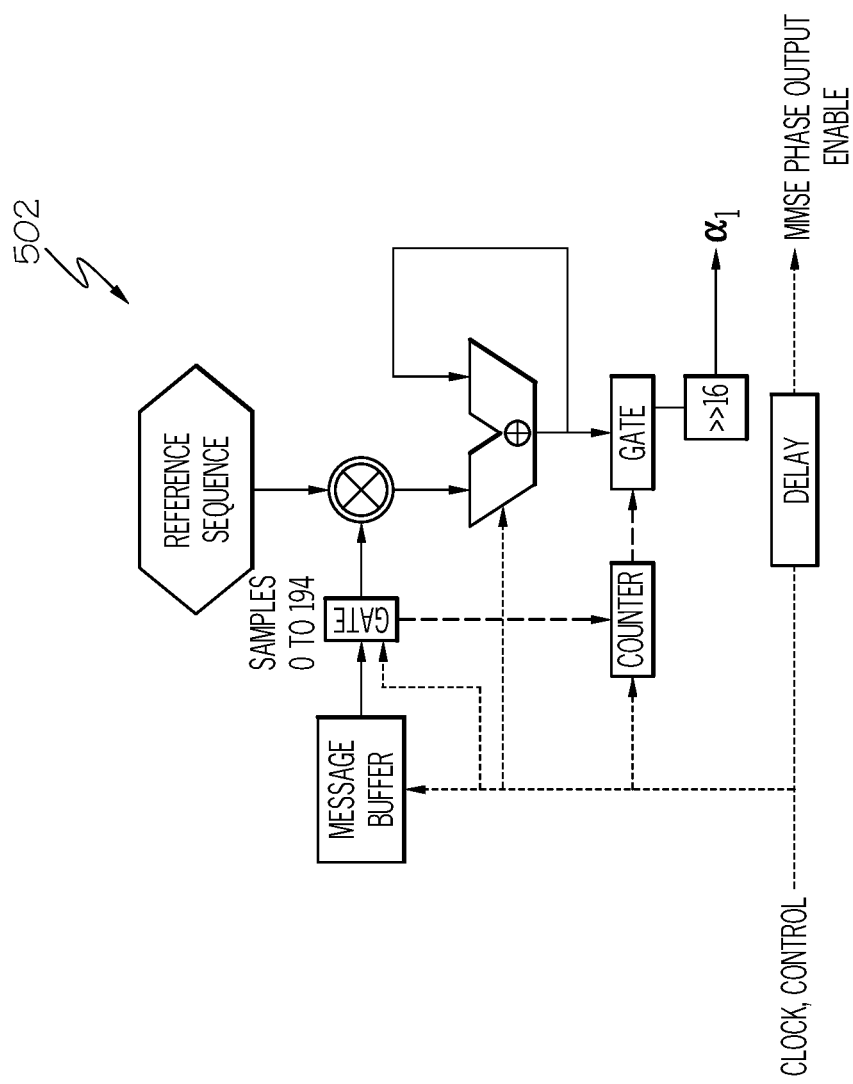

Referring now to FIG. 5, in some implementations, the estimate of the 1090 MHz Mode S ES ADS-B message (or a portion thereof) may be generated by MMSE estimator block 502 of the example multi-layer screening test block 312, one particular example of which is illustrated in greater detail in FIG. 6 and another particular example of which is illustrated in greater detail in FIG. 13.

Figure 7:
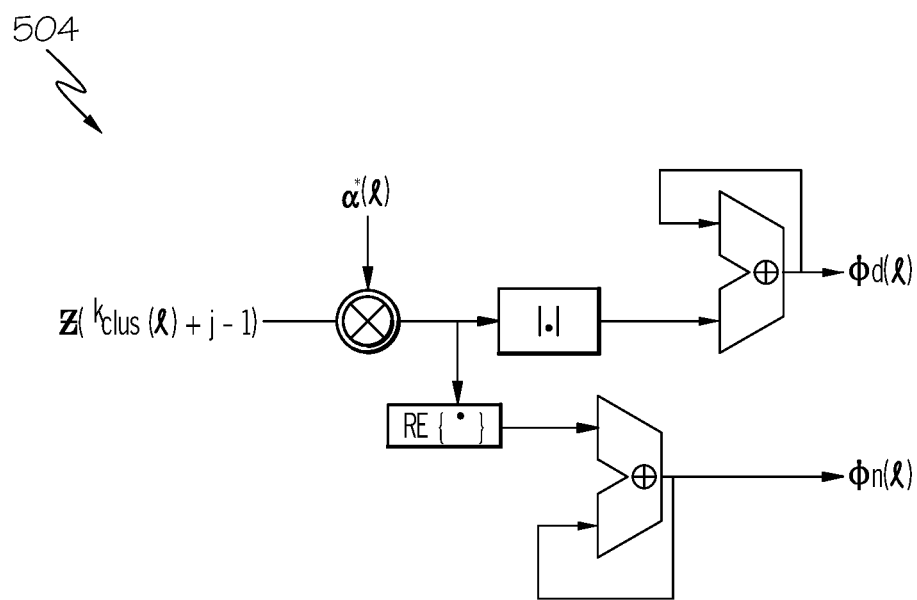
FIG. 7 is a functional block diagram of one example of a module configured to calculate the residual phase error of a signal in accordance with a non-limiting implementation of the present disclosure.
Figure 8:
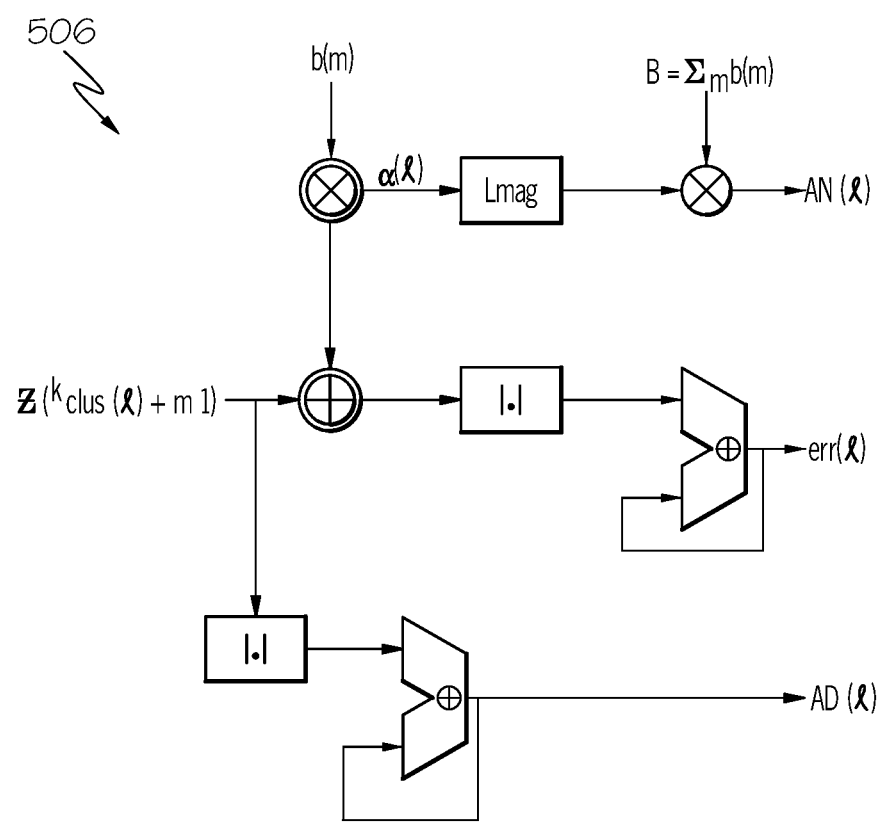
FIG. 8 is a functional block diagram of one example of a module configured to calculate a measure of the amplitude consistency of pulses within a signal and a measure of the phase consistency of the signal in accordance with a non-limiting implementation of the present disclosure.

Referring again to FIG. 2, at step 260, a feature vector representing some number n different features of the estimate of the 1090 MHz Mode S ES ADS-B message (or portion thereof) may be generated. Depending on the implementation, various different features of the estimate may be represented in the feature vector. In some implementations, one or more of a measure of the amplitude consistency of pulses within the estimate, a measure of the phase consistency of the estimate, and a measure of the residual phase error of the estimate may be calculated and represented in the feature vector. For example, referring to FIG. 5, in some implementations, a measure of the residual phase error of the estimate may be calculated by the residual phase metric block 504 of the example multi-layer screening test block 312, one particular example of which is illustrated in greater detail in FIG. 7. Additionally or alternatively, in some implementations a measure of the amplitude consistency of pulses within the estimate and/or a measure of the phase consistency of the estimate may be calculated by the innovations metric block 506 of the example multi-layer screening test block 312, one particular example of which is illustrated in greater detail in FIG. 8.

Referring again to FIG. 2, at step 265 the feature vector may be projected into an n-dimensional feature space where each individual dimension of the feature space represents one of the features represented in the feature vector. Thereafter, at step 270, the projection of the feature vector of the estimate in the feature space is compared to a cluster of points in the feature space representing sample 1090 MHz Mode S ES ADS-B messages (or, if the estimate represents a portion of a 1090 MHz Mode S ES ADS-B message (e.g., the first 8 μsec or 13 μsec), corresponding portions of sample ADS-B messages).

At step 280, another determination is made as to the likelihood that the digital representation of the received signal includes a 1090 MHz Mode S ES ADS-B message, this time based on the results of the multi-layer screening of the digital representation of the received signal (or portion thereof). In the particular example illustrated in FIG. 2, where the multi-layer screening involves (i) generating an estimate of a 1090 MHz Mode S ES ADS-B message (or an estimate of a portion of a 1090 MHz Mode S ES ADS-B message) potentially included in the digital representation of the received signal from the digital representation of the received signal (or from a portion of the digital representation of the received signal) (255), (ii) generating a feature vector representing the estimate (260), (iii) projecting the feature vector into a feature space (265), and (iv) comparing the projection of the feature vector to a cluster of points in the feature space representing sample 1090 MHz Mode S ES ADS-B messages (or portions thereof) (270), the determination of the likelihood that the digital representation of the received signal includes a 1090 MHz Mode S ES ADS-B message may be based on the comparison of the projection of the feature vector to the cluster of samples.

For example, the comparison of the projection of the feature vector to the cluster of samples may involve calculating some measure of the distance between the projection of the feature vector and the cluster of samples in the feature space, and the determination of the likelihood that the digital representation of the received signal includes a 1090 MHz Mode S ES ADS-B message may be based on the calculated distance. For example, if the distance is less than some predefined threshold value, it may be determined that it is likely that the digital representation of the received signal includes a 1090 MHz Mode S ES ADS-B message. In contrast, if the distance is greater than the predefined threshold value, it may be determined that it is unlikely that the digital representation of the received signal includes a 1090 MHz Mode S ES ADS-B message. In some particular implementations where the comparison of the projection of the feature vector to the cluster of samples involves calculating a measure of the distance between the projection of the feature vector and the cluster of samples in the feature space, the measure of the distance may be calculated by calculating the Mahalanobis distance between the projection of the feature vector and a distribution of the samples in the feature space.

Figure 9:
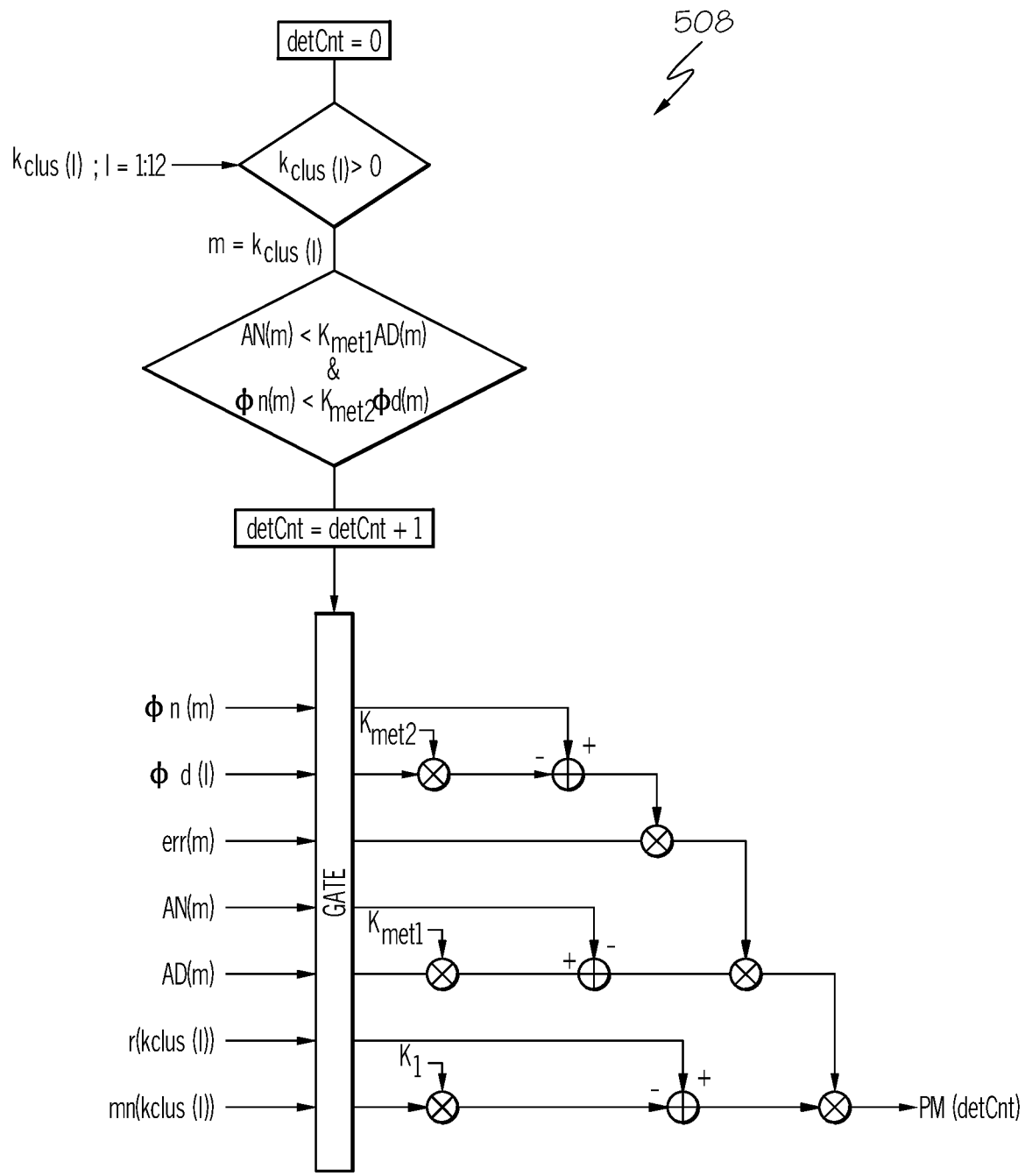
FIG. 9 is a functional block diagram of one example of a pattern recognition module in accordance with a non-limiting implementation of the present disclosure.

Referring now to FIG. 5, in the particular example implementation described above where the multi-layer screening of the digital representation of the received signal involves generating an estimate of a 1090 MHz Mode S ES ADS-B message (or an estimate of a portion of a 1090 MHz Mode S ES ADS-B message) potentially included in the digital representation of the received signal from the digital representation of the received signal (or from a portion of the digital representation of the received signal), generating a feature vector representing the residual phase error of the estimate, the amplitude consistency of pulses within the estimate, and the phase consistency of the estimate, projecting the feature vector into a corresponding 3-dimensional feature space, and determining the likelihood that the digital representation of the received signal includes a 1090 MHz Mode S ES ADS-B message based on the distance between the projection of the feature vector and a cluster of points representing sample 1090 MHz Mode S ES ADS-B messages (or portions thereof), pattern recognition module 508 of multi-layer screening module 312, one particular example of which is represented in greater detail in FIG. 9, generates the feature vector, projects the feature vector into the feature space, and calculates the distance between the projection of the feature vector and the cluster of samples.

In some implementations, pattern recognition module 508 may be implemented in circuitry that performs processing that is functionally equivalent (or functionally similar) to the functions of generating the feature vector, projecting the feature vector into the feature space, and calculating the distance between the projection of the feature vector and the cluster of samples. Additionally or alternatively, in some implementations, pattern recognition module 508 may perform the functions (or functional equivalents) of generating the feature vector, projecting the feature vector into the feature space, and calculating the distance between the projection of the feature vector and the cluster of samples in one dimension in a manner that approximates performing such functions in n dimensions.

Figure 10:
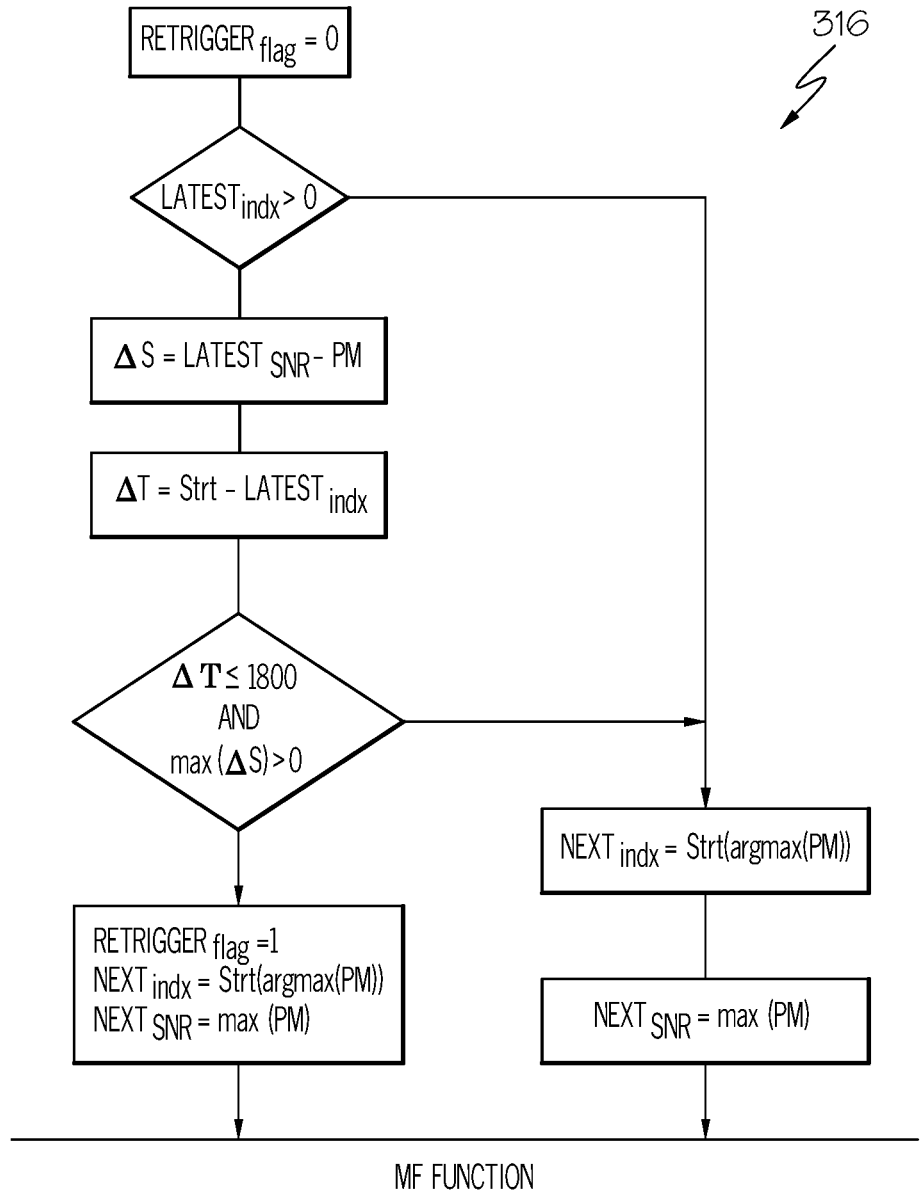
FIG. 10 is a functional block diagram of one example of a re-triggering test module in accordance with a non-limiting implementation of the present disclosure.

In some implementations, re-triggering testing may be performed while the digital representation of the received signal (or portion thereof) is being processed by multi-layer signal screening test block 312. For example, re-triggering test module 316 of receiver 300 of FIG. 3, one example of a particular implementation of which is illustrated in more detail in FIG. 10, may perform such re-triggering testing. The purpose of this re-triggering testing may be to determine if upcoming samples of the received signal are more likely to include an actual 1090 MHz Mode S ES ADS-B message (or portion thereof) than the digital representation of the received signal (or portion thereof) currently being processed by multi-layer signal screening test block 312 and, if so, to focus on the upcoming samples of the received signal determined to be more likely to include an actual 1090 MHz Mode S ES ADS-B message than the samples currently being processed.

Figure 12:
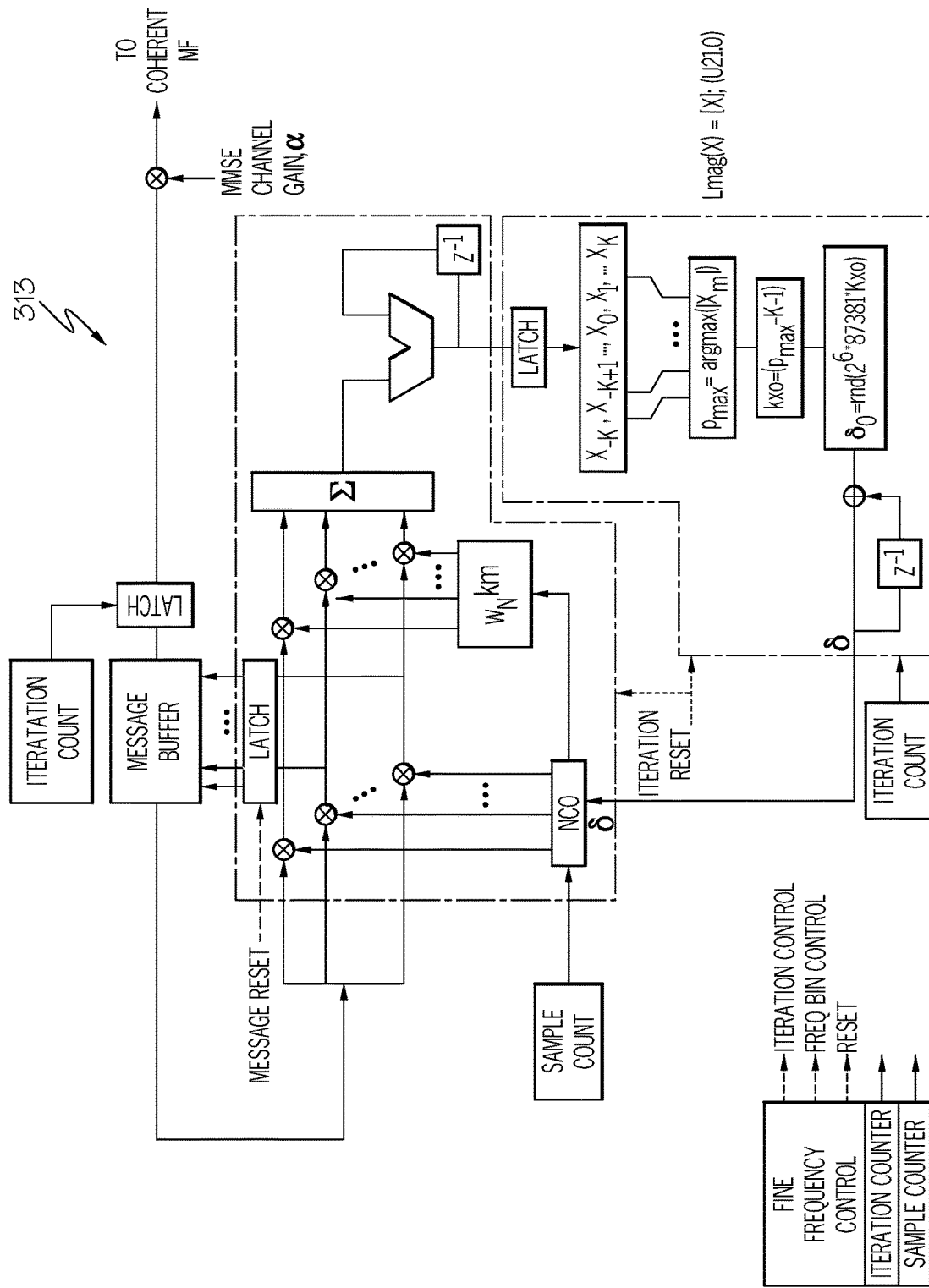
FIG. 12 is a functional block diagram of one example of a carrier refinement module in accordance with a non-limiting implementation of the present disclosure.

Referring again to FIG. 2, if a determination is made that it is unlikely that the digital representation of the received signal includes a 1090 MHz Mode S ES ADS-B message, the process 200 returns to step 210. Alternatively, if a determination is made that it is likely that the digital representation of the received signal includes a 1090 MHz Mode S ES ADS-B message, the process 200 may proceed to step 285 where the frequency of carrier pulses in the digital representation of the received signal may be estimated and shifted and the phase of carrier pulses in the digital representation of the received signal may be aligned with a desired phase. For example, in some implementations, carrier refinement module 313 of receiver 300 of FIG. 3, one particular example of which is illustrated in greater detail in FIG. 12, may estimate the frequency of carrier pulses in the digital representation of the received signal, shift the frequency of carrier pulses in the received signal toward a desired frequency and/or align the phase of carrier pulses in the digital representation of the received signal with a desired phase. In the particular example illustrated in FIG. 12, the carrier refinement module is an iterative carrier refinement module. It should be understood that, in the context of this disclosure, references to aligning the phase of carrier pulses in the digital representation of the received signal with a desired phase may not signify perfectly aligning the phase of carrier pulses in the digital representation of the received signal with a desired phase but, instead, may signify substantially aligning the phase of carrier pulses in the digital representation of the received signal with a desired phase. In some implementations, processing performed by carrier refinement module 313 effectively may rotate signal power of the digital representation of the received signal from the imaginary axis to the real axis.

In some implementations, based on the estimate of the 1090 MHz Mode S ES ADS-B message (or portion thereof) generated by multi-layer signal screening test block 312, multi-layer signal screening test block 312 may generate, among other output, an indication of a coarse estimate of the frequency of carrier pulses in the digital representation of the received signal, a bit_sync output that provides timing information about the digital representation of the received signal (e.g., suggesting where bit transitions occur in the digital representation of the received signal to facilitate the later sampling of bits from the output of the coherent matched filter), and/or a msg_sync output that provides an indication of the offset to the first data bit in the digital representation of the received signal (e.g., to facilitate subsequent processing of the actual message and not the preamble).

In implementations in which multi-layer signal screening test block 312 generates an indication of a coarse estimate of the frequency of carrier pulses in the digital representation of the received signal, carrier refinement module 313 may receive the indication of the coarse estimate of the frequency of carrier pulses in the digital representation of the received signal and use the coarse estimate of the frequency of carrier pulses in the digital representation of the received signal in connection with more finely estimating the frequency of carrier pulses in the digital representation of the received signal, shifting the frequency of carrier pulses in the received signal to a desired frequency, and/or aligning the phase of carrier pulses in the digital representation of the received signal with a desired phase. For example, in some implementations, carrier refinement module 313 may determine the offset between the desired frequency and the coarse estimate of the frequency of carrier pulses in the digital representation of the received signal and attempt to shift the frequency of the carrier pulses in the digital representation of the received signal by the determined offset in order to shift the frequency of the carrier pulses in the digital representation of the received signal toward the desired frequency. Thereafter, the carrier refinement module 313 may use a fast Fourier transform (FFT) algorithm to compute the discrete-time Fourier transform (DTFT) of the digital representation of the received signal (or a portion thereof) and use the DTFT of the digital representation of the received signal (or portion thereof) to determine the frequency of the peak energy in the digital representation of the received signal (or portion thereof). The carrier refinement module 313 then may determine the offset between the desired frequency and the frequency of the peak energy in the digital representation of the received signal (or portion thereof) and attempt to shift the frequency of the carrier pulses in the digital representation of the received signal by the determined offset in order to shift the frequency of the carrier pulses in the digital representation of the received signal toward the desired frequency. In some implementations, the carrier refinement module 313 may iteratively repeat this process some defined number of times (e.g., 3 or 4 times) or until the offset between the desired frequency and the frequency of the peak energy in the digital representation of the received signal falls below a defined threshold value.

Figure 14:
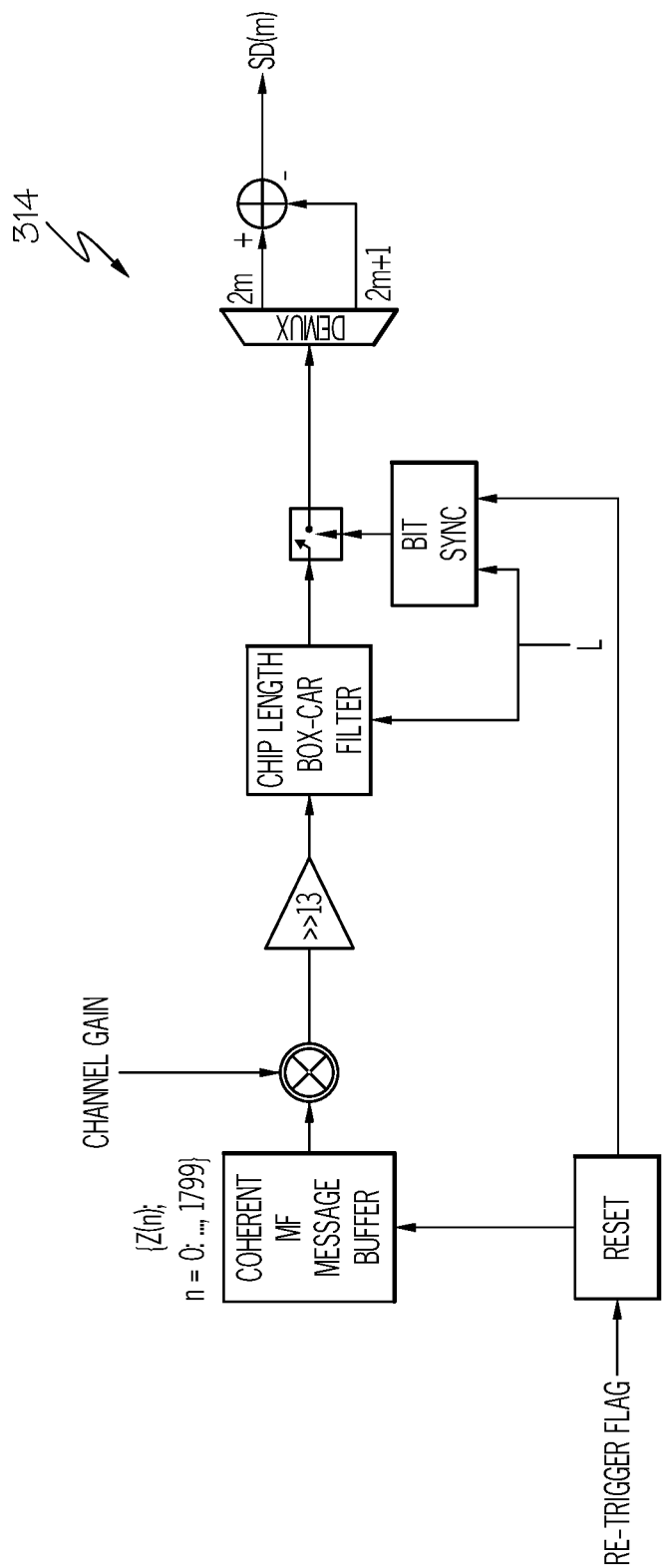
FIG. 14 is a functional block diagram of one example of a coherent matched filter module in accordance with a non-limiting implementation of the present disclosure.

Referring again to FIG. 2, at step 290, a coherent matched filter that is phase-matched to the desired phase is used to recover the 1090 MHz Mode S ES ADS-B message from the digital representation of the received signal. For example, coherent matched filter module 314 of receiver 300 of FIG. 3, one particular example of which is illustrated in greater detail in FIG. 14, may process the digital representation of the received signal to recover the 1090 MHz Mode S ES ADS-B message from the digital representation of the received signal. Coherent matched filter module 314 may be said to include a matched filter because the filter is matched to the 0.5 μsec 1090 MHz expected pulse form of a 1090 MHz Mode S ES ADS-B message. Stated differently, the impulse response of the matched filter may be a 0.5 μsec 1090 MHz pulse matched to the expected pulse form of a 1090 MHz Mode S ES ADS-B message. For example, in some implementations, the matched filter may include a box-car filter. More particularly, where the received message is sampled at a rate of 15 samples per μsec, coherent matched filter module 314 may include a box-car filter with 15 coefficients with the first seven coefficients having weights of 1 and the last eight coefficients having weights of 0. Furthermore, coherent matched filter module 314 may be said to include a coherent filter because the phase of the carrier pulses in the digital representation of the received signal has been matched to the filter in the coherent matched filter module 314.

In implementations in which multi-layer signal screening test block 312 generates a bit_sync output that provides timing information about the digital representation of the received signal, coherent matched filter module 314 may receive the bit_sync output from the multi-layer signal screening test block 312 as input and use the bit_sync input to coordinate the timing of the sampling of the output of the coherent matched filter.

After the 1090 MHz Mode S ES ADS-B message has been recovered from the received signal, the actual bits of the message still need to be demodulated. For example, determinations need to be made as to whether samples of the recovered message correspond to 1s or 0s. Therefore, the recovered 1090 MHz Mode S ES ADS-B message output by coherent matched filter module 314 may be processed by one or more of both soft-decision decoder 318 and hard-decision decoder 320 to demodulate the actual bits of the message. Additionally or alternatively, in some implementations, after the bits of the ADS-B message have been demodulated, the bits of the ADS-B message may be processed by an error detection and correction module 322 in an effort to detect and correct any errors in the decoded bits (e.g., due to noise or other impairments during the transmission or processing of the received signal).

Thereafter, the recovered ADS-B message may be output by the receiver 300, for example, for transmission to elsewhere in the system. For example, in implementations where receiver 300 is hosted on a satellite, the recovered ADS-B message may be output by the receiver 300 for transmission by the satellite to a terrestrial Earth terminal, either by the satellite directly or through a network of satellites, such as, for example, the network 20 of satellites illustrated in FIG. 1.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more machine-readable media having machine-readable program code embodied thereon.

Any combination of one or more machine-readable media may be utilized. The machine-readable media may be a machine-readable signal medium or a machine-readable storage medium. A machine-readable storage medium may be, for example, but not limited to, an electronic, magnetic, optical, electromagnetic, or semiconductor system, apparatus, or device, or any suitable combination of the foregoing. More specific examples (a non-exhaustive list) of such a machine-readable storage medium include the following: a hard disk, a random access memory (RAM), a read-only memory (ROM), an erasable programmable read-only memory (EPROM or Flash memory), an appropriate optical fiber with a repeater, an optical storage device, a magnetic storage device, or any suitable combination of the foregoing. In the context of this document, a machine-readable storage medium may be any tangible medium that can contain, or store a program for use by or in connection with an instruction execution system, apparatus, or device, such as, for example, a microprocessor.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and machine-readable instructions.

The receiver designs and techniques for receiving signals described herein may be employed in a wide variety of different contexts. For example, while the receiver designs and techniques for receiving signals described herein may be employed to receive 1090 MHz Mode S ES ADS-B messages terrestrially and/or in space, for example from low-Earth orbit or other orbits, they also may be capable of being employed to receive other types of signals or messages whether terrestrially or in space.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method for determining a 1090 MHz Mode S Extended Squitter ("ES") ADS-B message from a received signal comprising:
   receiving a signal at a receiver;
   applying at least one screening technique to determine if it is likely that the received signal includes a 1090 MHz Mode S ES ADS-B message;
   determining a measure of the likelihood that the received signal includes a 1090 MHz Mode S ES ADS-B message; and
   in response to determining that it is likely that the received signal includes a 1090 MHz Mode S ES ADS-B message:
      generating a modified version of the received signal by shifting the frequency of the received signal toward a desired frequency and aligning the phase of the received signal with a desired phase; and
      recovering the 1090 MHz Mode S ES ADS-B message from the modified signal, using a coherent matched filter that is phase-matched to the desired phase.

2. The method of claim 1, wherein the at least one screening technique to determine if it is likely that the received signal includes a 1090 MHz Mode S ES ADS-B message comprises either using an expected pulse pattern of a preamble of the received signal and a plurality of bit periods of a data block of the received message to determine if it is likely that the received signal includes a 1090 MHz Mode S ES ADS-B message, or applying constant false alarm rate detection processing to a portion of the received signal to determine if it is likely that the received signal includes a 1090 MHz Mode S ES ADS-B message.

3. The method of claim 1, wherein applying at least one screening technique to determine if it is likely that the received signal includes a 1090 MHz Mode S ES ADS-B message comprises using an expected pulse pattern of a preamble of the received signal and a plurality of bit periods of a data block of the received message to determine if it is likely that the received signal includes a 1090 MHz Mode S ES ADS-B message.

4. The method of claim 1, wherein applying at least one screening technique to determine if it is likely that the received signal includes a 1090 MHz Mode S ES ADS-B message comprises applying constant false alarm rate detection processing to a portion of the received signal to determine if it is likely that the received signal includes a 1090 MHz Mode S ES ADS-B message.

5. The method of claim 1, wherein determining a measure of the likelihood that the received signal includes a 1090 MHz Mode S ES ADS-B message comprises cross correlation between samples of a portion of the received signal and a reference signal.

6. The method of claim 1, further comprising determining whether the measure of the likelihood that the received signal includes a 1090 MHz Mode S ES ADS-B message exceeds a predetermined threshold value.

7. The method of claim 6, further comprising, in response to determining that the measure of the likelihood that the received signal includes a 1090 MHz Mode S ES ADS-B message exceeds a predetermined threshold value, performing additional screening to determine if the received signal includes a 1090 MHz Mode S ES ADS-B message.

8. The method of claim 1, wherein applying at least one screening technique to determine if it is likely that the received signal includes a 1090 MHz Mode S ES ADS-B message comprises comparing at least part of the received signal to a model of at least part of an expected 1090 MHz Mode S ES ADS-B message to determine if it is likely that a received signal includes a 1090 MHz Mode S ES ADS-B message.

9. The method of claim 1, wherein applying at least one screening technique to determine if it is likely that the received signal includes a 1090 MHz Mode S ES ADS-B message comprises generating a feature vector comprising n elements representing n detected features of at least part of the received signal and compare the feature vector to representations of parts of a characteristic 1090 MHz Mode S ES ADS-B messages to determine if it is likely that a received signal includes a 1090 MHz Mode S ES ADS-B message.

10. A receiver for receiving 1090 MHz Mode S Extended Squitter ("ES") ADS-B messages, comprising:
    a receiver for receiving a signal;
    processing componentry to apply at least one screening technique to determine if it is likely that the received signal includes a 1090 MHz Mode S ES ADS-B message wherein applying at least one screening technique to determine if it is likely that the received signal includes a 1090 MHz Mode S ES ADS-B message comprises generating a feature vector comprising n elements representing n detected features of at least part of the received signal and compare the feature vector to representations of parts of a characteristic 1090 MHz Mode S ES ADS-B messages to determine if it is likely that a received signal includes a 1090 MHz Mode S ES ADS-B message;
    processing componentry to, in response to determining that it is likely that the received signal includes a 1090 MHz Mode S ES ADS-B message:
       generate a modified version of the received signal by shifting the frequency of the received signal toward a desired frequency and align the phase of the received signal with a desired phase; and
    processing componentry to recover the 1090 MHz Mode S ES ADS-B message from the modified signal, using a coherent matched filter that is phase-matched to the desired phase.

11. The receiver of claim 10, wherein the at least one screening technique to determine if it is likely that the received signal includes a 1090 MHz Mode S ES ADS-B message comprises either using an expected pulse pattern of a preamble of the received signal and a plurality of bit periods of a data block of the received message to determine if it is likely that the received signal includes a 1090 MHz Mode S ES ADS-B message, or applying constant false alarm rate detection processing to a portion of the received signal to determine if it is likely that the received signal includes a 1090 MHz Mode S ES ADS-B message.

12. The receiver of claim 10, wherein applying at least one screening technique to determine if it is likely that the received signal includes a 1090 MHz Mode S ES ADS-B message comprises using an expected pulse pattern of a preamble of the received signal and a plurality of bit periods of a data block of the received message to determine if it is likely that the received signal includes a 1090 MHz Mode S ES ADS-B message.

13. The receiver of claim 10, wherein applying at least one screening technique to determine if it is likely that the received signal includes a 1090 MHz Mode S ES ADS-B message comprises applying constant false alarm rate detection processing to a portion of the received signal to determine if it is likely that the received signal includes a 1090 MHz Mode S ES ADS-B message.

14. The receiver of claim 10, further comprising processing componentry to determine a measure of the likelihood that the received signal includes a 1090 MHz Mode S ES ADS-B message.

15. The receiver of claim 14, wherein determining a measure of the likelihood that the received signal includes a 1090 MHz Mode S ES ADS-B message comprises cross correlation between samples of a portion of the received signal and a reference signal.

16. The receiver of claim 14, further comprising determining whether the measure of the likelihood that the received signal includes a 1090 MHz Mode S ES ADS-B message exceeds a predetermined threshold value.

17. The receiver of claim 16, further comprising, in response to determining whether the measure of the likelihood that the received signal includes a 1090 MHz Mode S ES ADS-B message exceeds a predetermined threshold value, performing additional screening to determine if the received signal includes a 1090 MHz Mode S ES ADS-B message.

18. The receiver of claim 16, wherein applying at least one screening technique to determine if it is likely that the received signal includes a 1090 MHz Mode S ES ADS-B message comprises comparing at least part of the received signal to a model of at least part of an expected 1090 MHz Mode S ES ADS-B message to determine if it is likely that a received signal includes a 1090 MHz Mode S ES ADS-B message.

* * * * *